US012643618B2

(12) United States Patent
Turhan et al.

(10) Patent No.: US 12,643,618 B2
(45) Date of Patent: Jun. 2, 2026

(54) ACTIVE DOWNFORCE CONTROL FOR DRIFTING MANEUVERS

(71) Applicant: GM Global Technology Operations LLC, Detroit, MI (US)

(72) Inventors: Mustafa Hakan Turhan, Kitchener (CA); Reza Hajiloo, Richmond Hill (CA); Ehsan Asadi, Markham (CA); Mansour Ataei, Richmond Hill (CA); Mohammad Pournazeri, Etobicoke (CA); Seyedalireza Kasaiezadeh Mahabadi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 18/787,480

(22) Filed: Jul. 29, 2024

(65) Prior Publication Data
US 2026/0028070 A1 Jan. 29, 2026

(51) Int. Cl.
B62D 37/02 (2006.01)
(52) U.S. Cl.
CPC .................................... B62D 37/02 (2013.01)
(58) Field of Classification Search
CPC ...... B62D 37/02; B62D 35/007; B62D 35/00; B61H 11/00
See application file for complete search history.

(56) References Cited

U.S. PATENT DOCUMENTS

| | | | | |
|---|---|---|---|---|
| 10,035,548 B2 * | 7/2018 | Barber | ................ | B62D 35/007 |
| 10,596,902 B2 * | 3/2020 | Lim | ................... | B60K 23/0808 |
| 12,403,962 B2 * | 9/2025 | Allmandinger | ........ | G06N 20/00 |

(Continued)

FOREIGN PATENT DOCUMENTS

| | | | | | |
|---|---|---|---|---|---|
| CN | 114084140 A | * | 2/2022 | ......... | B60W 40/112 |
| DE | 102011111934 A1 | * | 2/2013 | ...... | B60W 30/18172 |

(Continued)

OTHER PUBLICATIONS

"Cutler, Mark; How, Jonathan; Autonomous Drifting using Simulation-Aided Reinforcement Learning; 2016; 2016 IEEE International Conference on Robotics and Automation (ICRA)" (Year: 2016).*

(Continued)

*Primary Examiner* — Ramya P Burgess
*Assistant Examiner* — Christopher R Cardimino
(74) *Attorney, Agent, or Firm* — Vivacqua Crane, PLLC

(57) ABSTRACT

A method for drift detection and control for a vehicle may include determining an intentional drift probability of the vehicle based at least in part on one or more occupant inputs. The method further may include determining an initial aero bias upper bound using a first control system. The method further may include determining an initial aero bias command using a second control system. The method further may include determining a final aero bias upper bound based at least in part on the intentional drift probability, the initial aero bias upper bound, and the initial aero bias command. The method further may include controlling one or more aerodynamic actuators of the vehicle based at least in part on the final aero bias upper bound and the initial aero bias command.

20 Claims, 2 Drawing Sheets

(56)                     References Cited

U.S. PATENT DOCUMENTS

| | | | | |
|---|---|---|---|---|
| 2013/0226414 | A1* | 8/2013 | De Luca ................ | B62D 37/02 |
| | | | | 701/49 |
| 2019/0100194 | A1* | 4/2019 | Fahland .......... | B60W 30/18109 |
| 2022/0161874 | A1* | 5/2022 | Nahidi ................. | B62D 35/005 |
| 2024/0025393 | A1 | 1/2024 | Mehrabi et al. | |
| 2024/0101132 | A1* | 3/2024 | Šoštaric ............ | B60W 50/0098 |
| 2024/0166216 | A1* | 5/2024 | Park ...................... | B60W 40/13 |

FOREIGN PATENT DOCUMENTS

| | | | | | |
|---|---|---|---|---|---|
| DE | 102020116851 | A1 | * | 12/2021 | ........... B62D 35/007 |
| EP | 4385845 | A1 | * | 6/2024 | ........... B62D 35/007 |

OTHER PUBLICATIONS

"Yu, Wei; Gao, Wei; A Review of the influence of active aerodynamic tail on vehicle handling stability; 2021; Hubei Key Laboratory of Automotive Power Train and Electronic Control, Hubei University of Automotive Technology, Shiyan, China" (Year: 2021).*
Pournazeri, M., et al. U.S. Appl. No. 18/350,508, filed Jul. 11, 2023.
United States Patent and Trademark Office. U.S. Appl. No. 18/350,508, filed Jul. 11, 2023.
United States Patent and Trademark Office. U.S. Appl. No. 18/782,212, filed Jul. 24, 2024.

* cited by examiner

ACTIVE DOWNFORCE CONTROL FOR DRIFTING MANEUVERS

INTRODUCTION

The present disclosure relates to systems and methods for control of active downforce systems for a vehicle.

To increase vehicle performance and capability, vehicles may be equipped with active downforce systems to provide increased traction under certain conditions. For example, vehicles may include one or more aerodynamic elements, such as spoilers, fins, wings, diffusers, and/or the like, which may be moved or adjusted using electromechanical, hydraulic, and/or pneumatic actuation systems. The actuation systems can precisely control the position and angle of the aerodynamic elements to induce front and/or rear downforce on the vehicle. By generating additional downforce, the active downforce system may increase front and/or rear traction, thereby improving grip on the road surface. Increased traction may allow for more aggressive cornering, improved acceleration, and better braking performance. However, certain vehicle maneuvers may require reduced traction or controlled loss of traction (e.g., drifting). Accordingly, current active downforce systems may hinder or prevent drivers from intentionally performing certain vehicle maneuvers.

Thus, while current active downforce systems and methods achieve their intended purpose, there is a need for a new and improved system and method for drift detection and control for a vehicle.

SUMMARY

According to several aspects, a method for drift detection and control for a vehicle is provided. The method may include determining an intentional drift probability of the vehicle based at least in part on one or more occupant inputs. The method further may include determining an initial aero bias upper bound using a first control system. The method further may include determining an initial aero bias command using a second control system. The method further may include determining a final aero bias upper bound based at least in part on the intentional drift probability, the initial aero bias upper bound, and the initial aero bias command. The method further may include controlling one or more aerodynamic actuators of the vehicle based at least in part on the final aero bias upper bound and the initial aero bias command.

In another aspect of the present disclosure, determining the intentional drift probability further may include identifying a drift initiation phase based at least in part on the one or more occupant inputs. Determining the intentional drift probability further may include identifying a drifting phase based at least in part on the one or more occupant inputs in response to identifying the drift initiation phase. Determining the intentional drift probability further may include determining the intentional drift probability based at least in part on the one or more occupant inputs in response to identifying the drifting phase.

In another aspect of the present disclosure, identifying the drift initiation phase further may include identifying the drift initiation phase based at least in part on the one or more occupant inputs. The one or more occupant inputs includes at least a steering wheel angle.

In another aspect of the present disclosure, identifying the drifting phase further may include identifying the drifting phase based at least in part on the one or more occupant inputs in response to identifying the drift initiation phase. The one or more occupant inputs includes at least a steering wheel angle and an accelerator pedal position.

In another aspect of the present disclosure, determining the intentional drift probability further may include determining the intentional drift probability based at least in part on the one or more occupant inputs in response to identifying the drifting phase. The one or more occupant inputs includes at least an accelerator pedal position.

In another aspect of the present disclosure, determining the initial aero bias upper bound further may include determining the initial aero bias upper bound using the first control system. The first control system is a feedback control system.

In another aspect of the present disclosure, determining the initial aero bias command further may include determining the initial aero bias command using the second control system based at least in part on a requested lateral acceleration of the vehicle. The second control system is a feedforward control system.

In another aspect of the present disclosure, determining the final aero bias upper bound further may include determining the final aero bias upper bound using a formula:

$$AB_{fub} = (AB_c * p) + (AB_{iub} * (1 - p))$$

where $AB_{fub}$ is the final aero bias upper bound, $AB_c$ is the initial aero bias command, p is the intentional drift probability, and $AB_{iub}$ is the initial aero bias upper bound.

In another aspect of the present disclosure, controlling the one or more aerodynamic actuators further may include determining a front downforce setpoint based at least in part on the final aero bias upper bound and the initial aero bias command; Controlling the one or more aerodynamic actuators further may include determining a rear downforce setpoint based at least in part on the final aero bias upper bound and the initial aero bias command; Controlling the one or more aerodynamic actuators further may include controlling the one or more aerodynamic actuators based at least in part on the front downforce setpoint and the rear downforce setpoint.

In another aspect of the present disclosure, controlling the one or more aerodynamic actuators further may include determining a front aerodynamic actuator setpoint based at least in part on the front downforce setpoint. Controlling the one or more aerodynamic actuators further may include determining a rear aerodynamic actuator setpoint based at least in part on the rear downforce setpoint. Controlling the one or more aerodynamic actuators further may include controlling a front aerodynamic actuator of the one or more aerodynamic actuators based at least in part on the front aerodynamic actuator setpoint. Controlling the one or more aerodynamic actuators further may include controlling a rear aerodynamic actuator of the one or more aerodynamic actuators based at least in part on the rear aerodynamic actuator setpoint.

According to several aspects, a system for drift detection and control for a vehicle is provided. The system may include one or more vehicle sensors including at least one of: an accelerator pedal position sensor and a steering wheel angle sensor. The system further may include one or more aerodynamic actuators including at least one of: a front aerodynamic actuator and a rear aerodynamic actuator. The system further may include a controller in electrical communication with the accelerator pedal position sensor, the steering wheel angle sensor, the front aerodynamic actuator, and the rear aerodynamic actuator. The controller is programmed to determine an intentional drift probability of the vehicle based at least in part on one or more occupant inputs received using the one or more vehicle sensors. The controller is further programmed to determine an initial aero bias upper bound using a first control system. The controller is further programmed to determine an initial aero bias command using a second control system. The controller is further programmed to determine a final aero bias upper bound based at least in part on the intentional drift probability, the initial aero bias upper bound, and the initial aero bias command. The controller is further programmed to control the one or more aerodynamic actuators based at least in part on the final aero bias upper bound and the initial aero bias command.

In another aspect of the present disclosure, to determine the intentional drift probability, the controller is further programmed to identify a drift initiation phase based at least in part on the one or more occupant inputs. The one or more occupant inputs includes at least a steering wheel angle. To determine the intentional drift probability, the controller is further programmed to identify a drifting phase based at least in part on the one or more occupant inputs in response to identifying the drift initiation phase. The one or more occupant inputs further includes an accelerator pedal position. To determine the intentional drift probability, the controller is further programmed to determine the intentional drift probability based at least in part on the one or more occupant inputs in response to identifying the drifting phase.

In another aspect of the present disclosure, to determine the initial aero bias upper bound, the controller is further programmed to determine the initial aero bias upper bound using the first control system. The first control system is a feedback control system.

In another aspect of the present disclosure, to determine the initial aero bias command, the controller is further programmed to determine the initial aero bias command using the second control system based at least in part on a requested lateral acceleration of the vehicle. The second control system is a feedforward control system.

In another aspect of the present disclosure, to determine the final aero bias upper bound, the controller is further programmed to determine the final aero bias upper bound using a formula:

$$AB_{fub} = (AB_c * p) + (AB_{iub} * (1 - p))$$

where $AB_{fub}$ is the final aero bias upper bound, $AB_c$ is the initial aero bias command, p is the intentional drift probability, and $AB_{iub}$ is the initial aero bias upper bound.

In another aspect of the present disclosure, to control the one or more aerodynamic actuators, the controller is further programmed to determine a front downforce setpoint based at least in part on the final aero bias upper bound and the initial aero bias command. To control the one or more aerodynamic actuators, the controller is further programmed to determine a rear downforce setpoint based at least in part on the final aero bias upper bound and the initial aero bias command. To control the one or more aerodynamic actuators, the controller is further programmed to control the one or more aerodynamic actuators based at least in part on the front downforce setpoint and the rear downforce setpoint.

In another aspect of the present disclosure, to control the one or more aerodynamic actuators, the controller is further programmed to determine a front aerodynamic actuator setpoint based at least in part on the front downforce setpoint. To control the one or more aerodynamic actuators, the controller is further programmed to determine a rear aerodynamic actuator setpoint based at least in part on the rear downforce setpoint. To control the one or more aerodynamic actuators, the controller is further programmed to control the front aerodynamic actuator of the one or more aerodynamic actuators based at least in part on the front aerodynamic actuator setpoint. To control the one or more aerodynamic actuators, the controller is further programmed to control the rear aerodynamic actuator of the one or more aerodynamic actuators based at least in part on the rear aerodynamic actuator setpoint.

According to several aspects, a method for drift detection and control for a vehicle is provided. The method may include identifying a drift initiation phase based at least in part on one or more occupant inputs. The one or more occupant inputs includes at least a steering wheel angle. The method further may include identifying a drifting phase based at least in part on the one or more occupant inputs in response to identifying the drift initiation phase. The one or more occupant inputs includes at least a steering wheel angle and an accelerator pedal position. The method further may include determining an intentional drift probability based at least in part on the one or more occupant inputs in response to identifying the drifting phase. The one or more occupant inputs includes at least an accelerator pedal position. The method further may include determining an initial aero bias upper bound using a first control system. The first control system is a feedback control system. The method further may include determining an initial aero bias command using a second control system based at least in part on a requested lateral acceleration of the vehicle. The second control system is a feedforward control system. The method further may include determining a final aero bias upper bound using a formula:

$$AB_{fub} = (AB_c * p) + (AB_{iub} * (1 - p))$$

where $AB_{fub}$ is the final aero bias upper bound, $AB_c$ is the initial aero bias command, p is the intentional drift probability, and $AB_{iub}$ is the initial aero bias upper bound. The method further may include controlling one or more aerodynamic actuators of the vehicle based at least in part on the final aero bias upper bound and the initial aero bias command.

In another aspect of the present disclosure, controlling the one or more aerodynamic actuators further may include determining a front downforce setpoint based at least in part on the final aero bias upper bound and the initial aero bias command. Controlling the one or more aerodynamic actuators further may include determining a rear downforce setpoint based at least in part on the final aero bias upper bound and the initial aero bias command. Controlling the one or more aerodynamic actuators further may include controlling the one or more aerodynamic actuators based at least in part on the front downforce setpoint and the rear downforce setpoint.

In another aspect of the present disclosure, controlling the one or more aerodynamic actuators further may include determining a front aerodynamic actuator setpoint based at least in part on the front downforce setpoint. Controlling the one or more aerodynamic actuators further may include determining a rear aerodynamic actuator setpoint based at least in part on the rear downforce setpoint. Controlling the one or more aerodynamic actuators further may include controlling a front aerodynamic actuator of the one or more aerodynamic actuators based at least in part on the front aerodynamic actuator setpoint. Controlling the one or more aerodynamic actuators further may include controlling a rear aerodynamic actuator of the one or more aerodynamic actuators based at least in part on the rear aerodynamic actuator setpoint.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Active downforce systems and methods for vehicles may be used to provide increased traction under certain conditions, improving vehicle performance. However, certain vehicle maneuvers may require reduced traction or even controlled loss of traction (e.g., drifting). Accordingly, active downforce systems which are configured to maximize traction may hinder or prevent drivers from intentionally performing certain vehicle maneuvers. Therefore, the present disclosure provides a new and improve system and method for drift detection and control for a vehicle, allowing for detection of intentional drifting and providing control of active downforce elements which is consistent with driver intentions.

Figure 1:
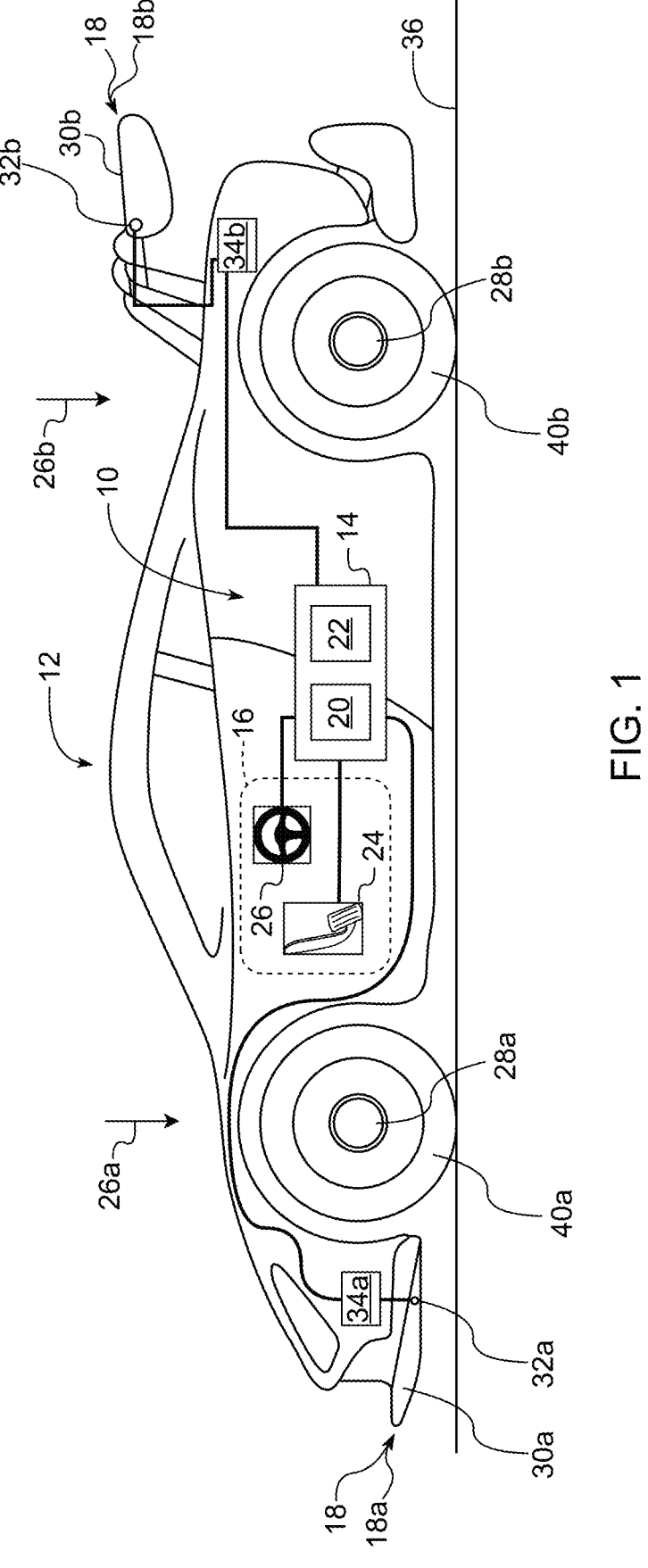
FIG. 1 is a schematic diagram of a system for drift detection and control for a vehicle, according to an exemplary embodiment.

Referring to FIG. 1, a system for drift detection and control for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, one or more vehicle sensors 16, and one or more aerodynamic actuators 18.

The controller 14 is used to implement a method 100 for drift detection and control for a vehicle, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions.

The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12.

The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the one or more vehicle sensors 16 and the one or more aerodynamic actuators 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure. It should further be understood that, in the scope of the present disclosure, electrical communication also includes power and/or energy transfer between electrical devices (e.g., using conducting wires and/or wireless power transmission techniques).

The one or more vehicle sensors 16 are used to acquire information relevant to the vehicle 12. In an exemplary embodiment, the one or more vehicle sensors 16 includes at least an accelerator pedal position sensor 24 and a steering wheel angle sensor 26.

In another exemplary embodiment, the one or more vehicle sensors 16 further includes sensors to determine performance data about the vehicle 12. In a non-limiting example, the one or more vehicle sensors 16 further includes at least one of a motor speed sensor, a motor torque sensor, an electric drive motor voltage and/or current sensor, a brake position sensor, a coolant temperature sensor, a cooling fan speed sensor, a transmission oil temperature sensor, a front suspension ride height sensor, a rear suspension ride height sensor, a yaw rate sensor, one or more wheel speed sensors, and an inertial measurement unit (IMU).

In another exemplary embodiment, the one or more vehicle sensors 16 further includes sensors to determine information about an environment within the vehicle 12. In a non-limiting example, the one or more vehicle sensors 16 further includes at least one of a seat occupancy sensor, a cabin air temperature sensor, a cabin motion detection sensor, a cabin camera, a cabin microphone, and/or the like.

In another exemplary embodiment, the one or more vehicle sensors 16 further includes sensors to determine information about an environment surrounding the vehicle 12. In a non-limiting example, the one or more vehicle sensors 16 further includes at least one of an ambient air temperature sensor, a barometric pressure sensor, a vehicle communication system, a global navigation satellite system (GNSS), and/or a photo and/or video camera which is positioned to view the environment in front of the vehicle 12.

In another exemplary embodiment, at least one of the one or more vehicle sensors 16 is a perception sensor capable of perceiving objects and/or measuring distances in the environment surrounding the vehicle 12. In a non-limiting example, the one or more vehicle sensors 16 includes a stereoscopic camera having distance measurement capabilities. In one example, at least one of the one or more vehicle sensors 16 is affixed inside of the vehicle 12, for example, in a headliner of the vehicle 12, having a view through a windscreen of the vehicle 12. In another example, at least one of the one or more vehicle sensors 16 is affixed outside of the vehicle 12, for example, on a roof of the vehicle 12, having a view of the environment surrounding the vehicle 12. It should be understood that various additional types of perception sensors, such as, for example, LiDAR sensors, ultrasonic ranging sensors, radar sensors, and/or time-of-flight sensors are within the scope of the present disclosure. The one or more vehicle sensors 16 are in electrical communication with the controller 14 as discussed above.

The accelerator pedal position sensor 24 is used to measure a position of an accelerator pedal of the vehicle 12. In an exemplary embodiment, the accelerator pedal position sensor 24 is an electro-mechanical sensor which converts a mechanical movement of the accelerator pedal into an electrical signal. In a non-limiting example, the accelerator pedal position sensor 24 includes a potentiometer having at least a first terminal electrically connected to a wiper, and a second terminal. The wiper of the potentiometer is affixed (e.g., by way of a mechanical linkage, a gearset, and/or the like) to the accelerator pedal. Therefore, an electrical resistance measured between the first terminal (i.e., the wiper) and the second terminal is proportional to a position of the accelerator pedal. Accordingly, by measuring the electrical resistance between the first terminal and the second terminal of the potentiometer, the controller 14 determines a position of the accelerator pedal. It should be understood that additional sensors for measuring a position of the accelerator pedal (e.g., rotary encoders, proximity sensors, and the like) are within the scope of the present disclosure.

The steering wheel angle sensor 26 is used to measure a position (i.e., an angle) of a steering wheel of the vehicle 12. In an exemplary embodiment, the steering wheel angle sensor 26 is an electro-mechanical sensor which converts a mechanical movement of the steering wheel into an electrical signal. In a non-limiting example, the steering wheel angle sensor 26 includes a potentiometer having at least a first terminal electrically connected to a wiper, and a second terminal. The wiper of the potentiometer is affixed (e.g., by way of a mechanical linkage, a gearset, and/or the like) to the steering wheel. Therefore, an electrical resistance measured between the first terminal (i.e., the wiper) and the second terminal is proportional to a position of the steering wheel. Accordingly, by measuring the electrical resistance between the first terminal and the second terminal of the potentiometer, the controller 14 determines a position and thus a steering angle of the steering wheel. It should be understood that additional sensors for measuring a position of the steering wheel (e.g., rotary encoders, proximity sensors, and the like) are within the scope of the present disclosure.

The one or more aerodynamic actuators 18 are used to adjust drag on the vehicle 12 and/or adjust aerodynamic downforce on the vehicle 12. In an exemplary embodiment, the one or more aerodynamic actuators 18 include a front aerodynamic actuator 18a and a rear aerodynamic actuator 18b.

The front aerodynamic actuator 18a is used to adjust a front downforce 26a at or near a front axle 28a of the vehicle 12. In the scope of the present disclosure, the term "downforce" means a force component that is perpendicular to the direction of relative motion of the vehicle 12, i.e., in the longitudinal direction, toward a road surface 36. In the scope of the present disclosure, the term "front downforce" means a downforce applied at or near to the front axle 28a of the vehicle 12. The front aerodynamic actuator 18a includes a first aerodynamic body 30a, a first pivot 32a, and a first actuator motor 34a.

The first aerodynamic body 30a is used to adjust drag and/or aerodynamic downforce by disrupting air movement across the vehicle 12. In an exemplary embodiment, the first aerodynamic body 30a is configured as a wing-shaped spoiler. In the present disclosure, the term "wing-shaped" is defined as having a shape of a wing, i.e., a fin having a shape of an airfoil defined by a streamlined cross-sectional shape producing lift for flight or propulsion through a fluid. The term "spoiler" means an aerodynamic device capable of disrupting air movement across the vehicle 12 while the vehicle 12 is in motion, thereby adjusting drag and/or adjusting an aerodynamic downforce on the vehicle 12.

The first pivot 32a is used to enable rotational movement between the first aerodynamic body 30a and the vehicle 12. In an exemplary embodiment, the first pivot 32a is a hinge. In a non-limiting example, the hinge includes a pivot pin (not shown) and two hinge plates (not shown) in mechanical connection with the pivot pin. The pivot pin allows the hinge plates to rotate relative to each other, and the hinge plates are attached to the respective components (i.e., one to the vehicle 12 and one to the first aerodynamic body 30a) to facilitate their rotational movement. It should be understood that the first pivot 32a may include any mechanical construction or linkage allowing rotational or pivoting movement, including, for example, any combination of hinges, bearings, pivot pins, ball and socket joints, swivel joints, bushings, universal joints, clevis pins, trunnions, and/or the like.

The first actuator motor 34a is used to actuate (i.e., move) the first aerodynamic body 30a to adjust drag and/or aerodynamic downforce. In an exemplary embodiment, the first actuator motor 34a is an electric machine (e.g., a DC-brushed motor, a DC-brushless motor, and AC motor, a linear actuator, and/or the like) coupled to the first aerodynamic body 30a through the first pivot 32a. In another exemplary embodiment, the first actuator motor 34a includes a pneumatic or hydraulic actuator. It should be understood that any actuator operable to actuate (i.e., move) the first aerodynamic body 30a is within the scope of the present disclosure. Furthermore, any mechanical construction for coupling the first actuator motor 34a to the first aerodynamic body 30a, including, for example, chains, belts, pullies, gears, linkages, and/or the like is within the scope of the present disclosure. The first actuator motor 34a is in electrical communication with the controller 14 and is controllable by the controller 14, as will be discussed in greater detail below.

The rear aerodynamic actuator 18b is used to adjust a rear downforce 26b at or near a rear axle 28b of the vehicle 12. In the scope of the present disclosure, the term "rear downforce" means a downforce applied at or near to the rear axle 28b of the vehicle 12. The rear aerodynamic actuator 18b includes a second aerodynamic body 30b, a second pivot 32b, and a second actuator motor 34b.

The second aerodynamic body 30b is used to adjust drag and/or aerodynamic downforce by disrupting air movement across the vehicle 12. In an exemplary embodiment, the second aerodynamic body 30b is configured as a wing-shaped spoiler.

The second pivot 32b is used to enable rotational movement between the second aerodynamic body 30b and the vehicle 12. In an exemplary embodiment, the second pivot 32b is a hinge. In a non-limiting example, the hinge includes a pivot pin (not shown) and two hinge plates (not shown) in mechanical connection with the pivot pin. The pivot pin allows the hinge plates to rotate relative to each other, and the hinge plates are attached to the respective components (i.e., one to the vehicle 12 and one to the second aerodynamic body 30b) to facilitate their rotational movement. It should be understood that the second pivot 32b may include any mechanical construction or linkage allowing rotational or pivoting movement, including, for example, any combination of hinges, bearings, pivot pins, ball and socket joints, swivel joints, bushings, universal joints, clevis pins, trunnions, and/or the like.

The second actuator motor 34b is used to actuate (i.e., move) the second aerodynamic body 30b to adjust drag and/or aerodynamic downforce. In an exemplary embodiment, the second actuator motor 34b is an electric machine (e.g., a DC-brushed motor, a DC-brushless motor, and AC motor, a linear actuator, and/or the like) coupled to the second aerodynamic body 30b through the second pivot 32b. In another exemplary embodiment, the second actuator motor 34b includes a pneumatic or hydraulic actuator. It should be understood that any actuator operable to actuate (i.e., move) the second aerodynamic body 30b is within the scope of the present disclosure. Furthermore, any mechanical construction for coupling the second actuator motor 34b to the second aerodynamic body 30b, including, for example, chains, belts, pullies, gears, linkages, and/or the like is within the scope of the present disclosure. The second actuator motor 34b is in electrical communication with the controller 14 and is controllable by the controller 14, as will be discussed in greater detail below.

In an exemplary embodiment, the front aerodynamic actuator 18a is located closer to the front axle 28a than to the rear axle 28b, such that the front aerodynamic actuator 18a effectively adjusts the front downforce 26a. In a non-limiting example, the front aerodynamic actuator 18a is mounted near and/or on a frunk, hood, front bumper, and/or the like of the vehicle 12. The rear aerodynamic actuator 18b is located closer to the rear axle 28b than to the front axle 28a, such that the rear aerodynamic actuator 18b effectively adjusts the rear downforce 26b. In a non-limiting example, the rear aerodynamic actuator 18b is mounted near and/or on a trunk, rear spoiler, rear bumper, and/or the like of the vehicle 12.

Figure 2:
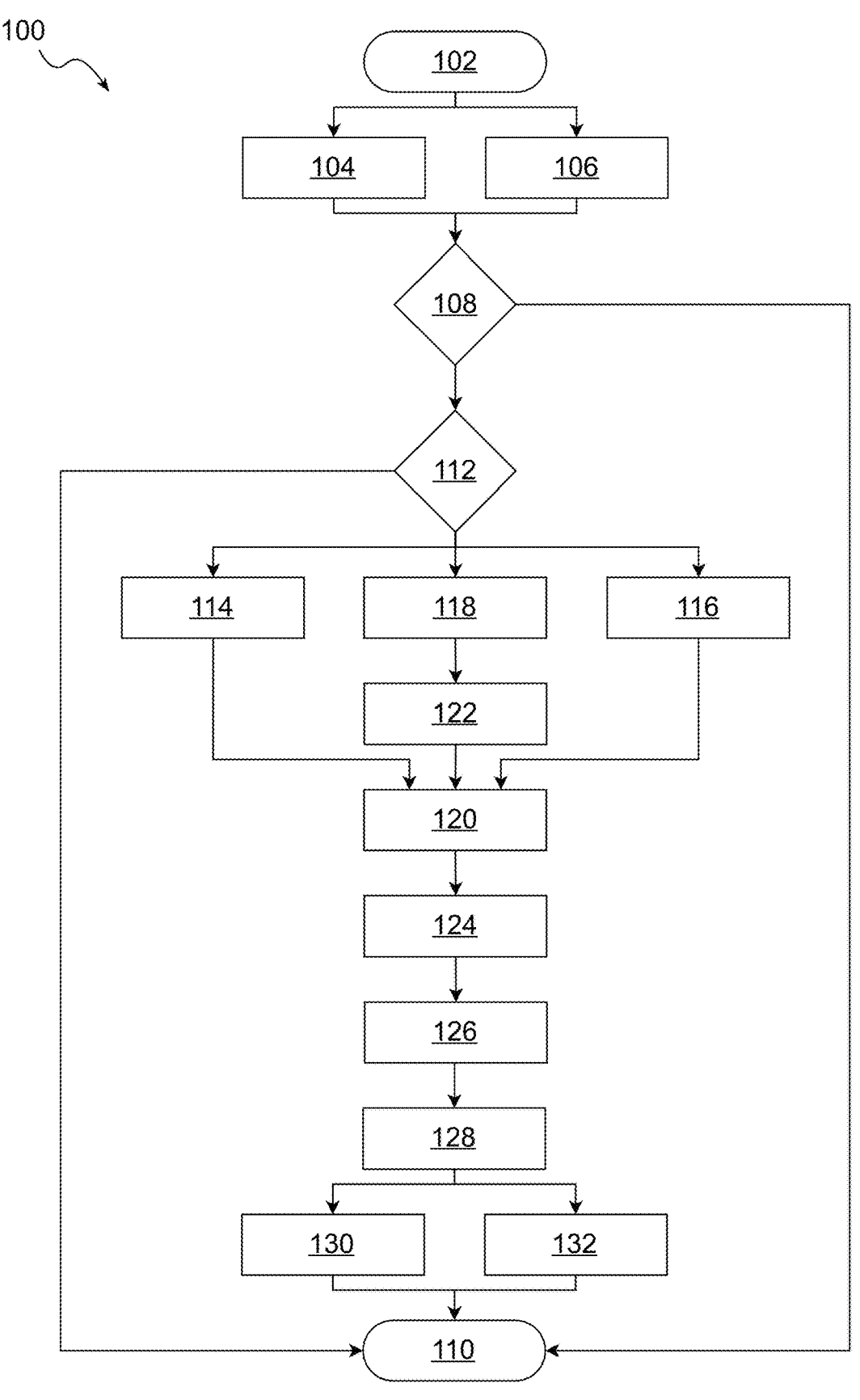
FIG. 2 is a flowchart of a method for drift detection and control for a vehicle, according to an exemplary embodiment.

Referring to FIG. 2, a flowchart of the method 100 for drift detection and control for a vehicle is provided. The method 100 begins at block 102 and proceeds to blocks 104 and 106. At block 104, the controller 14 determines an accelerator pedal position of the accelerator pedal of the vehicle 12 using the accelerator pedal position sensor 24. In an exemplary embodiment, the controller 14 captures and saves the accelerator pedal position over time. In a non-limiting example, the controller 14 performs statistical analysis of the saved accelerator pedal position data to determine rate of change of the accelerator pedal position, frequency of change of the accelerator pedal position, magnitude of change of the accelerator pedal position, and/or the like. The accelerator pedal position is considered to be an occupant input provided to the system 10 by an occupant (e.g., a driver) of the vehicle 12. After block 104, the method 100 proceeds to block 108, as will be discussed in greater detail below.

At block 106, the controller 14 determines a steering wheel angle of the steering wheel of the vehicle 12 using the steering wheel angle sensor 26. In an exemplary embodiment, the controller 14 captures and saves the steering wheel angle over time. In a non-limiting example, the controller 14 performs statistical analysis of the saved steering wheel angle data to determine rate of change of the steering wheel angle, frequency of change of the steering wheel angle, magnitude of change of the steering wheel angle, and/or the like. The steering wheel angle is considered to be an occupant input provided to the system 10 by the occupant (e.g., the driver) of the vehicle 12. After block 106, the method 100 proceeds to block 108.

At block 108, the controller 14 identifies a drift initiation phase based at least in part on at least one of the occupant inputs discussed above (i.e., the accelerator pedal position determined at block 104 and/or the steering wheel angle determined at block 106). In the scope of the present disclosure, drifting is a driving technique involving oversteer with loss of traction while the vehicle 12 is traversing a corner or a turn. In the scope of the present disclosure, oversteer is defined as a vehicle dynamic condition where a rear slip angle of the rear tires 40b of the vehicle 12 is greater than a front slip angle of the front tires 40a of the vehicle 12. In the scope of the present disclosure, the drift initiation phase means that the vehicle 12 has begun to oversteer with loss of traction. In an exemplary embodiment, an amount of oversteer and loss of traction is quantified based on measurements performed using the one or more vehicle sensors 16.

In a non-limiting example, the amount of oversteer is determined based on comparison between an expected yaw rate (determined based on the steering wheel angle as measured by the steering wheel angle sensor 26) and an actual yaw rate (determined using, for example, using the yaw rate sensor and/or the IMU). In non-limiting example, the loss of traction is determined based on a comparison between an expected rear wheel speed (determined, for example, based on a velocity of the vehicle 12) and an actual rear wheel speed (determined, for example, using one or more wheel speed sensors). It should be understood that various additional methods for measuring or otherwise determining oversteer and loss of traction are within the scope of the present disclosure.

In a non-limiting example, if the amount of oversteer and the loss of traction exceed one or more predetermined thresholds, the controller 14 identifies the drift initiation phase. It should be understood that various additional methods for identifying the drift initiation phase, including methods described in U.S. Publication No. 2024-0025393 A1, titled "VEHICLE INTENTIONAL DRIFT DETECTION AND CONTROL", filed on Jul. 15, 2022, the entire contents of which is hereby incorporated by reference, are within the scope of the present disclosure. If the drift initiation phase is not identified at block 108, the method 100 proceeds to enter a standby state at block 110. If the drift initiation phase is identified at block 108, the method 100 proceeds to block 112.

At block 112, the controller 14 identifies a drifting phase based at least in part on at least one of the occupant inputs discussed above (i.e., the accelerator pedal position determined at block 104 and/or the steering wheel angle deter-mined at block 106). In the scope of the present disclosure, the drifting phase means that the vehicle 12 has begun to countersteer while maintaining accelerator pedal position after the drift initiation phase. In the scope of the present disclosure, countersteer means that the steering wheel of the vehicle 12 is turned opposite to the direction of the corner or turn being traversed by the vehicle 12 (and thus also opposite to the direction of the oversteer) in order to control the oversteer and prevent over-rotation (i.e., spin-out) of the vehicle 12. In an exemplary embodiment, the drifting phase is identified based on measurements performed using the one or more vehicle sensors 16.

In a non-limiting example, countersteer is identified based on the steering wheel angle determined at block 106. Fur-thermore, the accelerator pedal position determined at block 104 is monitored. In a non-limiting example, if the amount of countersteer and the accelerator pedal position exceed one or more predetermined thresholds, the controller 14 identi-fies the drifting phase. It should be understood that various additional methods for identifying the drifting phase, includ-ing methods described in U.S. Publication No. 2024-0025393 A1, titled "VEHICLE INTENTIONAL DRIFT DETECTION AND CONTROL", filed on Jul. 15, 2022, the entire contents of which is hereby incorporated by reference, are within the scope of the present disclosure. If the drifting phase is not identified at block 112, the method 100 proceeds to enter the standby state at block 110. If the drifting phase is identified at block 112, the method 100 proceeds to blocks 114, 116, and 118.

At block 114, the controller 14 determines an intentional drift probability. In the scope of the present disclosure, the intentional drift probability quantifies a probability that the drifting phase identified at block 112 is intentionally initi-ated by the occupant of the vehicle 12. In an exemplary embodiment, the intentional drift probability is determined based on one or more of a plurality of factors, such as, for example, steering wheel angle, amount of oversteer, under-steer, and/or countersteer, accelerator pedal position, vehicle longitudinal and/or lateral velocity, wheel speed, and/or the like. In a non-limiting example, the intentional drift prob-ability is determined based on the accelerator pedal position as determined at block 104. For example, a higher accel-erator pedal position (corresponding to more depression of the accelerator pedal by the occupant) corresponds to a higher intentional drift probability.

In a non-limiting example, the intentional drift probability is determined using a lookup table (LUT) which maps accelerator pedal position to the intentional drift probability. The LUT has a key column (i.e., a key column for the accelerator pedal position) and a value column (i.e., a value column for the intentional drift probability). In an exemplary embodiment, the LUT includes a plurality of rows, each of the plurality of rows mapping an accelerator pedal position in the key column to a value in the value column (i.e., the intentional drift probability). The LUT is stored in the media 22 of the controller 14. In an exemplary embodiment, the plurality of rows of the LUT are predetermined. In another exemplary embodiment, the plurality of rows of the LUT may be modified by the occupant, using, for example, a human-interface device. In yet another exemplary embodi-ment, the plurality of rows of the LUT may be updated over-the-air (OTA) using a vehicle communication system. In some examples, the LUT may be a multidimensional LUT including additional key columns such as, for example, vehicle velocity, steering wheel angle, and/or the like.

It should be understood that any method (e.g., program-matic data structure, logic equation, mathematical function, and/or the like) of mapping a plurality of keys (i.e., accel-erator pedal position) to a plurality of values (i.e., the intentional drift probability) is within the scope of the present disclosure. After block 114, the method 100 pro-ceeds to block 120, as will be discussed in greater detail below.

At block 116, the controller 14 determines an initial aero bias upper bound and an initial aero bias lower bound. In the scope of the present disclosure, the initial aero bias upper bound and the initial aero bias lower bound are bounds on an aero bias command for control of the one or more aerodynamic actuators 18. In the scope of the present disclosure, the aero bias command is a ratio of a commanded front downforce to a total commanded downforce. In an exemplary embodiment, the controller 14 uses a first control system to determine the initial aero bias upper bound and the initial aero bias lower bound. In a non-limiting example, the first control system is a feedback control system. In the scope of the present disclosure, feedback control is a control technique whereby adjustments are made to a process or system based on results or outcomes observed. In a non-limiting example, the initial aero bias upper bound and the initial aero bias lower bound are determined based at least in part on the steering wheel angle and an amount of wheel slip. In another non-limiting example, the initial aero bias upper bound and the initial aero bias lower bound are determined as discussed in U.S. application Ser. No. 18/782,212, titled "ACTIVE DOWNFORCE REACTIVE CONTROL BASED ON ADAPTIVE AERODYNAMIC BIAS BOUNDS", filed on Jul. 24, 2024, the entire contents of which is hereby incorporated by reference. After block 116, the method 100 proceeds to block 120, as will be discussed in greater detail below.

At block 118, the controller 14 determines a requested lateral acceleration of the vehicle 12. In the scope of the present disclosure, the requested lateral acceleration is a lateral acceleration desired or intended by the occupant in order to control the drifting maneuver. For example, the requested lateral acceleration may vary based on road sur-face condition, tire condition, dimensions of the vehicle 12, characteristics of the suspension system of the vehicle 12 (i.e., suspension geometry), intended turn radius, vehicle velocity, and/or the like. In an exemplary embodiment, the requested lateral acceleration is determined based at least in part on the steering wheel angle, a longitudinal velocity of the vehicle 12, and a wheelbase length of the vehicle 12. In a non-limiting example, the requested lateral acceleration is further determined based at least in part on an understeer characteristic of the vehicle 12. In a non-limiting example, the requested lateral acceleration is post-processed to filter, rate-of-change limit, and/or latch the calculated value of requested lateral acceleration. It should be understood that various additional methods for determining the requested lateral acceleration are within the scope of the present disclosure. After block 118, the method 100 proceeds to block 122.

At block 122, the controller 14 determines an initial aero bias command based at least in part on the requested lateral acceleration determined at block 118. In the scope of the present disclosure, the initial aero bias command is a ratio of a commanded front downforce to a total commanded down-force. In an exemplary embodiment, the controller 14 uses a second control system to determine the initial aero bias command. In a non-limiting example, the second control system is a feedforward control system. In the scope of the present disclosure, feedforward control is a control technique whereby adjustments are made based on anticipated deviations in results or outcomes, for example, by measuring disturbance variables and taking corrective action before the disturbance variables upset the process. In a non-limiting example, the initial aero bias command is determined according to techniques and methods described in U.S. application Ser. No. 18/350,508, titled "METHOD AND SYSTEM FOR DETERMINING THE DESIRED TIRE GRIP IN ACTIVE DOWNFORCE CONTROL", filed on Jul. 11, 2023, the entire contents of which is hereby incorporated by reference. After block 122, the method 100 proceeds to block 120.

At block 120, the controller 14 determines a final aero bias upper bond. In the scope of the present disclosure, the final aero bias upper bound is based on adjustment of the initial aero bias upper bound determined at block 116 based on drifting characteristics of the vehicle 12 and/or the driving scenario. In an exemplary embodiment, the final aero bias upper bound is determined based at least in part on the intentional drift probability determined at block 114, the initial aero bias upper bound determined at block 116, and the initial aero bias command determined at block 122. In a non-limiting example, the final aero bias upper bound is determined using a formula:

$$AB_{fub} = (AB_c * p) + (AB_{iub} * (1 - p)) \qquad (1)$$

where $AB_{fub}$ is the final aero bias upper bound, $AB_c$ is the initial aero bias command determined at block 122, p is the intentional drift probability determined at block 114, and $AB_{iub}$ is the initial aero bias upper bound determined at block 116. It should be understood that additional methods for determining the final aero bias upper bound are within the scope of the present disclosure. After block 120, the method 100 proceeds to block 124.

At block 124, the controller 14 determines a front downforce setpoint. In the scope of the present disclosure, the front downforce setpoint is an amount of downforce which should be applied by the front aerodynamic actuator 18a. In an exemplary embodiment, the front downforce setpoint is determined based at least in part on the initial aero bias command determined at block 122, the final aero bias upper bound determined at block 120, and an optimal total downforce. In the scope of the present disclosure, the optimal total downforce is a total front and rear downforce which is chosen to provide optimal vehicle handling, speed, performance, and/or efficiency. In a non-limiting example, the optimal total downforce is determined using one or more lookup tables (LUTs) based on measurements from the one or more vehicle sensors 16. In another non-limiting example, the optimal total downforce is determined using a feedback and/or feedforward control algorithm.

In a non-limiting example, the front downforce setpoint is determined by first comparing the initial aero bias command to the final aero bias upper bound. If the initial aero bias command is less than or equal to the final aero bias upper bound, the front downforce setpoint is equal to the initial aero bias command multiplied by the optimal total downforce. If the initial aero bias command is greater than the final aero bias upper bound, the front downforce setpoint is equal to the final aero bias upper bound multiplied by the optimal total downforce. In a non-limiting example, front downforce setpoint may also be determined based at least in part on the initial aero bias lower bound determined at block 116. After block 124, the method 100 proceeds to block 126.

At block 126, the controller 14 determines a rear downforce setpoint. In the scope of the present disclosure, the rear downforce setpoint is an amount of downforce which should be applied by the rear aerodynamic actuator 18b. In an exemplary embodiment, the rear downforce setpoint is determined based at least in part on front downforce setpoint determined at block 124 and the optimal total downforce. In a non-limiting example, the rear downforce setpoint is determined by subtracting the front downforce setpoint from the optimal total downforce. After block 126, the method 100 proceeds to block 128.

At block 128, the controller 14 determines a front aerodynamic actuator setpoint for the front aerodynamic actuator 18a based at least in part on the front downforce setpoint determined at block 124 and a rear aerodynamic actuator setpoint for the rear aerodynamic actuator 18b based at least in part on the rear downforce setpoint determined at block 126. In the scope of the present disclosure, the front aerodynamic actuator setpoint is a position of the first actuator motor 34a (i.e., an amount of motor shaft rotation or a position of the motor shaft relative to a known reference position) required to move the first aerodynamic body 30a such that the front downforce 26a equals the front downforce setpoint. In the scope of the present disclosure, the rear aerodynamic actuator setpoint is a position of the second actuator motor 34b (i.e., an amount of motor shaft rotation or a position of the motor shaft relative to a known reference position) required to move the second aerodynamic body 30b such that the rear downforce 26b equals the rear downforce setpoint.

In an exemplary embodiment, the front aerodynamic actuator setpoint and the rear aerodynamic actuator setpoint are determined based on various factors, including, for example, vehicle velocity, vehicle heading, weather conditions, design of the first aerodynamic body 30a, design of the second aerodynamic body 30b, and/or the like. In a non-limiting example, the front aerodynamic actuator setpoint and the rear aerodynamic actuator setpoint are determined using a feedback and/or feedforward control algorithm based on downforce measurements determined from a front suspension ride height sensor and/or a rear suspension ride height sensor. In another non-limiting example, the front aerodynamic actuator setpoint and the rear aerodynamic actuator setpoint are determined using a model predictive control (MPC) algorithm.

In an exemplary embodiment, the MPC algorithm is used to optimize the control inputs (i.e., the front aerodynamic actuator setpoint and the rear aerodynamic actuator setpoint) of a dynamic system (i.e., the vehicle 12 including the front aerodynamic actuator 18a and the rear aerodynamic actuator 18b). In a non-limiting example, the MPC algorithm includes a prediction model, a cost function, and a constraint handler. The prediction model predicts the future behavior of the system based on current and past states and inputs. In a non-limiting example, the prediction model includes a physics-based model of the aerodynamic characteristics of the vehicle 12, the actuation capabilities of the front aerodynamic actuator 18a, the actuation capabilities of the rear aerodynamic actuator 18b, and the effects of the front aerodynamic actuator 18a and the rear aerodynamic actuator 18b on the front downforce 26a and the rear downforce 26b.

The cost function evaluates the performance of the predicted behavior by assigning a numerical value to each predicted state and corresponding control input. In a non-limiting example, the cost function is configured to reach a minimum when the front downforce 26a is equal to the front downforce setpoint and the rear downforce 26b is equal to the rear downforce setpoint. The constraint handler ensures that the predicted states and control inputs adhere to specified limits and requirements. In a non-limiting example, the constraint handler ensures that physical and performance limits of the vehicle 12 and the front aerodynamic actuator 18a and the rear aerodynamic actuator 18b (e.g., maximum aerodynamic forces, maximum acceleration forces, maximum actuator travel, and/or the like) are respected. In another non-limiting example, the constraint handler ensures that the final aero bias upper bond determined at block 120 is not exceeded.

The MPC algorithm operates by first using the prediction model to forecast possible future states of the system over a specified prediction time horizon. In a non-limiting example, the prediction model forecasts future states based on various data, including data received from the one or more vehicle sensors 16 such as vehicle velocity, vehicle heading, vehicle yaw rate, steering wheel angle, accelerator pedal position, and/or the like. The cost function then calculates the cost associated with each possible future state and the corresponding control inputs. The constraint handler checks that all predictions comply with system constraints. The MPC algorithm iteratively adjusts the control inputs to minimize the cost while satisfying the constraints, ultimately determining the front aerodynamic actuator setpoint and the rear aerodynamic actuator setpoint. After block 128, the method 100 proceeds to blocks 130 and 132.

At block 130, the controller 14 actuates the first actuator motor 34a of the front aerodynamic actuator 18a based on the front aerodynamic actuator setpoint determined at block 128. As a result, the first aerodynamic body 30a is moved such as to adjust the front downforce 26a to be equal to the front downforce setpoint determined at block 128. After block 130, the method 100 proceeds to enter the standby state at block 110.

At block 132, the controller 14 actuates the second actuator motor 34b of the rear aerodynamic actuator 18b based on the rear aerodynamic actuator setpoint determined at block 128. As a result, the second aerodynamic body 30b is moved such as to adjust the rear downforce 26b to be equal to the rear downforce setpoint determined at block 128. After block 132, the method 100 proceeds to enter the standby state at block 110.

In an exemplary embodiment, first actuator motor 34a and the second actuator motor 34b are controlled in tandem based on the outputs of the single complete MPC algorithm to move both the first aerodynamic body 30a and the second aerodynamic body 30b such that the front downforce 26a is equal to the front downforce setpoint and such that the rear downforce 26b is equal to the rear downforce setpoint.

In an exemplary embodiment, the controller 14 repeatedly exits the standby state 110 and restarts the method 100 at block 102. In a non-limiting example, the controller 14 exits the standby state 110 and restarts the method 100 on a timer, for example, every three hundred milliseconds.

The system 10 and method 100 of the present disclosure offer several advantages. By determining the intentional drift probability, the system 10 and method 100 may be used to quantify a driver's intention and adapt vehicle performance to match driver intention. By determining the final aero bias upper bound based on the intentional drift probability, the system 10 and method 100 allow for optimization of downforce application by active aerodynamic elements in order to assist the driver in performing an intended maneuver (i.e., drifting) with the vehicle 12. Furthermore, when intentional drifting is detected, downforce application which may hinder or prevent drifting may be mitigated.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for drift detection and control for a vehicle, the method comprising:
   determining an intentional drift probability of the vehicle based at least in part on one or more occupant inputs;
   determining an initial aero bias upper bound using a first control system;
   determining an initial aero bias command using a second control system;
   determining a final aero bias upper bound based at least in part on the intentional drift probability, the initial aero bias upper bound, and the initial aero bias command; and
   controlling one or more aerodynamic actuators of the vehicle based at least in part on the final aero bias upper bound and the initial aero bias command.

2. The method of claim 1, wherein determining the intentional drift probability further comprises:
   identifying a drift initiation phase based at least in part on the one or more occupant inputs;
   identifying a drifting phase based at least in part on the one or more occupant inputs in response to identifying the drift initiation phase; and
   determining the intentional drift probability based at least in part on the one or more occupant inputs in response to identifying the drifting phase.

3. The method of claim 2, wherein identifying the drift initiation phase further comprises:
   identifying the drift initiation phase based at least in part on the one or more occupant inputs, wherein the one or more occupant inputs includes at least a steering wheel angle.

4. The method of claim 2, wherein identifying the drifting phase further comprises:
   identifying the drifting phase based at least in part on the one or more occupant inputs in response to identifying the drift initiation phase, wherein the one or more occupant inputs includes at least a steering wheel angle and an accelerator pedal position.

5. The method of claim 2, wherein determining the intentional drift probability further comprises:
   determining the intentional drift probability based at least in part on the one or more occupant inputs in response to identifying the drifting phase, wherein the one or more occupant inputs includes at least an accelerator pedal position.

6. The method of claim 1, wherein determining the initial aero bias upper bound further comprises:
   determining the initial aero bias upper bound using the first control system, wherein the first control system is a feedback control system.

7. The method of claim 1, wherein determining the initial aero bias command further comprises:
   determining the initial aero bias command using the second control system based at least in part on a requested lateral acceleration of the vehicle, wherein the second control system is a feedforward control system.

8. The method of claim 1, wherein determining the final aero bias upper bound further comprises:

determining the final aero bias upper bound using a formula:

$$AB_{fub} = (AB_c * p) + (AB_{iub} * (1 - p))$$

wherein $AB_{fub}$ is the final aero bias upper bound, $AB_c$ is the initial aero bias command, p is the intentional drift probability, and $AB_{iub}$ is the initial aero bias upper bound.

9. The method of claim 1, wherein controlling the one or more aerodynamic actuators further comprises:

determining a front downforce setpoint based at least in part on the final aero bias upper bound and the initial aero bias command;

determining a rear downforce setpoint based at least in part on the final aero bias upper bound and the initial aero bias command; and controlling the one or more aerodynamic actuators based at least in part on the front downforce setpoint and the rear downforce setpoint.

10. The method of claim 9, wherein controlling the one or more aerodynamic actuators further comprises:

determining a front aerodynamic actuator setpoint based at least in part on the front downforce setpoint;

determining a rear aerodynamic actuator setpoint based at least in part on the rear downforce setpoint;

controlling a front aerodynamic actuator of the one or more aerodynamic actuators based at least in part on the front aerodynamic actuator setpoint; and controlling a rear aerodynamic actuator of the one or more aerodynamic actuators based at least in part on the rear aerodynamic actuator setpoint.

11. A system for drift detection and control for a vehicle, the system comprising:

one or more vehicle sensors including at least one of: an accelerator pedal position sensor and a steering wheel angle sensor;

one or more aerodynamic actuators including at least one of: a front aerodynamic actuator and a rear aerodynamic actuator; and a controller in electrical communication with the accelerator pedal position sensor, the steering wheel angle sensor, the front aerodynamic actuator, and the rear aerodynamic actuator, wherein the controller is programmed to:

determine an intentional drift probability of the vehicle based at least in part on one or more occupant inputs received using the one or more vehicle sensors;

determine an initial aero bias upper bound using a first control system;

determine an initial aero bias command using a second control system;

determine a final aero bias upper bound based at least in part on the intentional drift probability, the initial aero bias upper bound, and the initial aero bias command; and control the one or more aerodynamic actuators based at least in part on the final aero bias upper bound and the initial aero bias command.

12. The system of claim 11, wherein to determine the intentional drift probability, the controller is further programmed to:

identify a drift initiation phase based at least in part on the one or more occupant inputs, wherein the one or more occupant inputs includes at least a steering wheel angle;

identify a drifting phase based at least in part on the one or more occupant inputs in response to identifying the drift initiation phase, wherein the one or more occupant inputs further includes an accelerator pedal position; and determine the intentional drift probability based at least in part on the one or more occupant inputs in response to identifying the drifting phase.

13. The system of claim 12, wherein to determine the initial aero bias upper bound, the controller is further programmed to:

determine the initial aero bias upper bound using the first control system, wherein the first control system is a feedback control system.

14. The system of claim 13, wherein to determine the initial aero bias command, the controller is further programmed to:

determine the initial aero bias command using the second control system based at least in part on a requested lateral acceleration of the vehicle, wherein the second control system is a feedforward control system.

15. The system of claim 14, wherein to determine the final aero bias upper bound, the controller is further programmed to:

determine the final aero bias upper bound using a formula:

$$AB_{fub} = (AB_c * p) + (AB_{iub} * (1 - p))$$

wherein $AB_{fub}$ is the final aero bias upper bound, $AB_c$ is the initial aero bias command, p is the intentional drift probability, and $AB_{iub}$ is the initial aero bias upper bound.

16. The system of claim 15, wherein to control the one or more aerodynamic actuators, the controller is further programmed to:

determine a front downforce setpoint based at least in part on the final aero bias upper bound and the initial aero bias command;

determine a rear downforce setpoint based at least in part on the final aero bias upper bound and the initial aero bias command; and control the one or more aerodynamic actuators based at least in part on the front downforce setpoint and the rear downforce setpoint.

17. The system of claim 16, wherein to control the one or more aerodynamic actuators, the controller is further programmed to:

determine a front aerodynamic actuator setpoint based at least in part on the front downforce setpoint;

determine a rear aerodynamic actuator setpoint based at least in part on the rear downforce setpoint;

control the front aerodynamic actuator of the one or more aerodynamic actuators based at least in part on the front aerodynamic actuator setpoint; and control the rear aerodynamic actuator of the one or more aerodynamic actuators based at least in part on the rear aerodynamic actuator setpoint.

18. A method for drift detection and control for a vehicle, the method comprising:

identifying a drift initiation phase based at least in part on one or more occupant inputs, wherein the one or more occupant inputs includes at least a steering wheel angle;

identifying a drifting phase based at least in part on the one or more occupant inputs in response to identifying the drift initiation phase, wherein the one or more occupant inputs includes at least a steering wheel angle and an accelerator pedal position;

determining an intentional drift probability based at least in part on the one or more occupant inputs in response to identifying the drifting phase, wherein the one or more occupant inputs includes at least an accelerator pedal position;

determining an initial aero bias upper bound using a first control system, wherein the first control system is a feedback control system;

determining an initial aero bias command using a second control system based at least in part on a requested lateral acceleration of the vehicle, wherein the second control system is a feedforward control system;

determining a final aero bias upper bound using a formula:

$$AB_{fub} = (AB_c * p) + (AB_{iub} * (1 - p))$$

wherein $AB_{fub}$ is the final aero bias upper bound, $AB_c$ is the initial aero bias command, p is the intentional drift probability, and $AB_{iub}$ is the initial aero bias upper bound; and controlling one or more aerodynamic actuators of the vehicle based at least in part on the final aero bias upper bound and the initial aero bias command.

19. The method of claim 18, wherein controlling the one or more aerodynamic actuators further comprises:

determining a front downforce setpoint based at least in part on the final aero bias upper bound and the initial aero bias command;

determining a rear downforce setpoint based at least in part on the final aero bias upper bound and the initial aero bias command; and controlling the one or more aerodynamic actuators based at least in part on the front downforce setpoint and the rear downforce setpoint.

20. The method of claim 19, wherein controlling the one or more aerodynamic actuators further comprises:

determining a front aerodynamic actuator setpoint based at least in part on the front downforce setpoint;

determining a rear aerodynamic actuator setpoint based at least in part on the rear downforce setpoint;

controlling a front aerodynamic actuator of the one or more aerodynamic actuators based at least in part on the front aerodynamic actuator setpoint; and controlling a rear aerodynamic actuator of the one or more aerodynamic actuators based at least in part on the rear aerodynamic actuator setpoint.

* * * * *